United States Patent [19]

Suzuki

[11] 3,997,270
[45] Dec. 14, 1976

[54] APPARATUS FOR MEASURING DIMENSIONS OF TRAVELLING OBJECTS

[75] Inventor: Toshio Suzuki, Tokyo, Japan
[73] Assignee: Shinri Kogyo Company Limited, Tokyo, Japan
[22] Filed: July 14, 1975
[21] Appl. No.: 595,831

[30] Foreign Application Priority Data

Aug. 23, 1974  Japan .............................. 49-96903

[52] U.S. Cl. .......................... 356/167; 250/223 R
[51] Int. Cl.² ....................................... G01B 11/04
[58] Field of Search ................... 356/102, 159–160, 356/167; 250/223–224, 223 B, 560, 571–572

[56] References Cited

UNITED STATES PATENTS

| | | | |
|---|---|---|---|
| 3,041,462 | 6/1962 | Ogle | 250/561 |
| 3,489,910 | 1/1970 | Böhme | 250/572 |
| 3,774,040 | 11/1973 | Stephanos | 250/560 |
| 3,797,937 | 3/1974 | Shofner | 356/102 |

Primary Examiner—Edward S. Bauer
Assistant Examiner—Wm. H. Punter
Attorney, Agent, or Firm—Lawrence I. Field

[57] ABSTRACT

An apparatus for measuring a dimension of an object which is travelling through a measuring position comprising a conveying belt, a pair of plane mirrors each of which is arranged at each side of said conveying belt, a laser light source producing a laser light beam which is repeatedly reflected between said plane mirrors so as to form a light screen at said measuring position and a photoelectric converting device receiving the laser beam leaving said plane mirrors. The apparatus further comprises a pulse generator for producing a number of pulses a repetition rate of which is proportional to the movement of said object, a pulse counter for counting the number of said pulses for a time interval during which said object enters in said light screen and a device for calculating said dimension of the object on the basis of a count value of said pulse counter.

2 Claims, 10 Drawing Figures

FIG._3A
Output of Pulse Shaper
FIG._3B
Output of Waveform Shaper 9
FIG._3C
Input to Counter 14
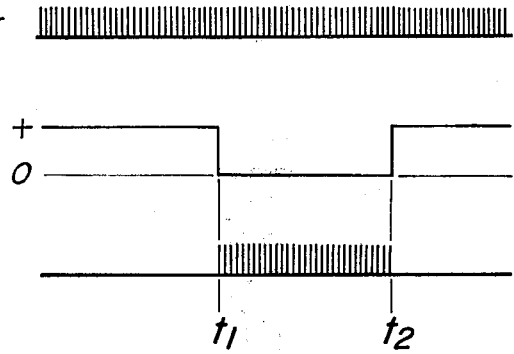
FIG._4
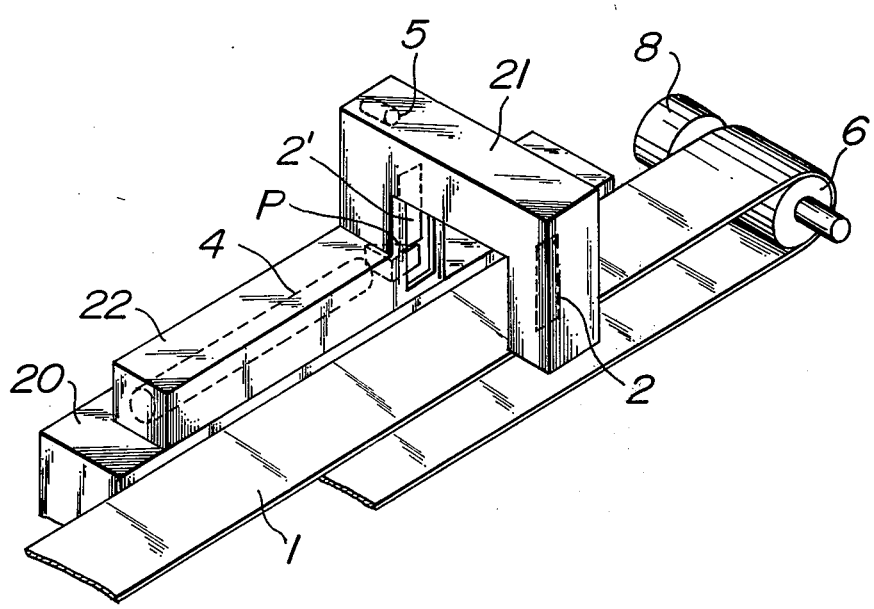

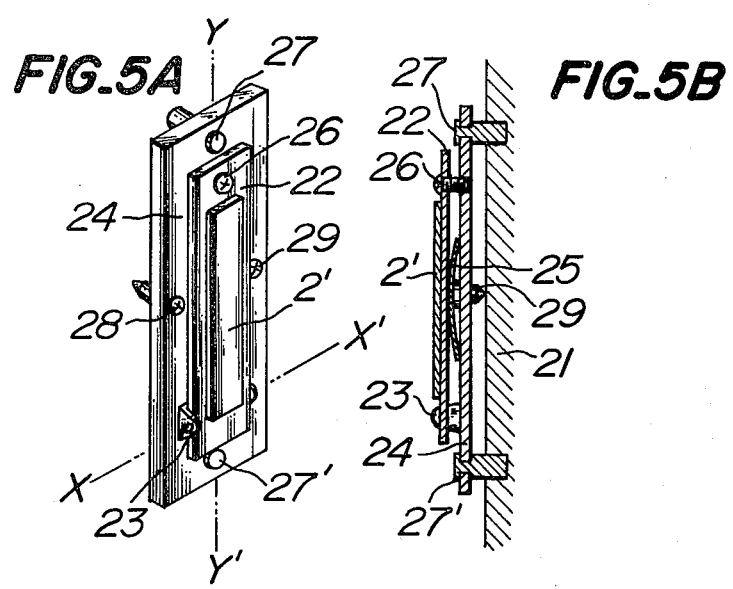
FIG.5A  FIG.5B
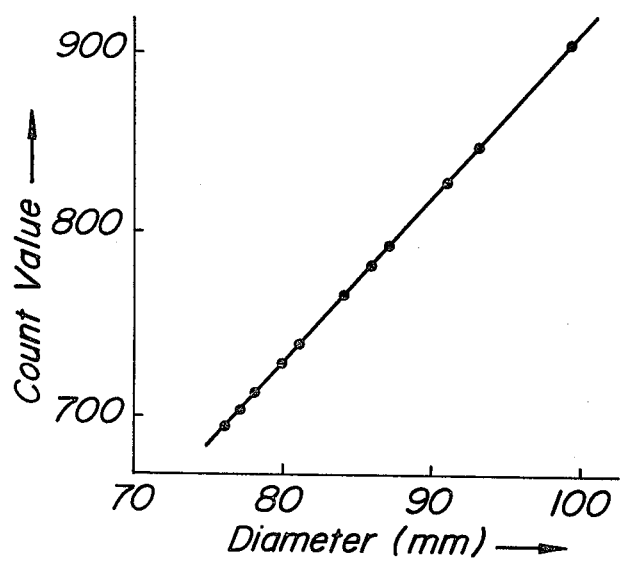
FIG_6

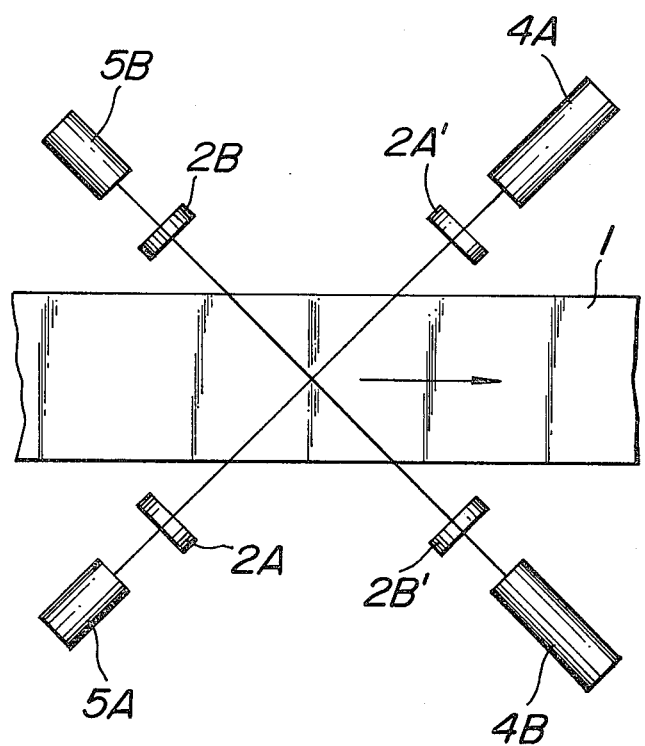
FIG_7

006
APPARATUS FOR MEASURING DIMENSIONS OF TRAVELLING OBJECTS

BACKGROUND OF THE INVENTION

The present invention relates to an apparatus for measuring dimensions of objects which are transfered by conveying means and more particualarly an apparatus for measuring diameters of fruits having various shapes such as apples, pears and peaches in the travelling direction, said fruits being conveyed successively past a measuring position.

It has been known to measure a length of travelling body in a non-contact manner with the aid of a light transmitting device and a light receiving device. However with only one set of these light transmitting and receiving devices it is not always possible to measure the maximum dimension of the object in the travelling direction. Such difficulty could be avoided by using a number of sets of the light transmitting and receiving devices. But in this case the cost of the measuring apparatus becomes high. Moreover in the known apparatus use is made of a light source comprising a usual lamp, so that only a thick light beam can be obtained and accurate measurement with high S/N could hardly be attained.

The present invention has for its object to provide an apparatus for measuring accurately dimensions of travelling objects with using a laser light beam and a pair of plane mirrors.

It is another object of the invention to provide an apparatus for measuring maximum diameters of fruits such as apples, pears and peaches which have various shapes.

SUMMARY OF THE INVENTION

An apparatus for measuring dimensions of travelling objects according to the invention comprises conveying means for transferring the objects to be measured through a measuring position; a pair of plane mirrors each of which is arranged at each side of said conveying means at said measuring position; a laser light source for producing a laser light beam which is incident upon one of said plane mirrors and is repeatedly reflected between said plane mirrors so as to form a light screen at said measuring position; photoelectric conventing means arranged to receive said laser light beam leaving said pair of plane mirrors, said photoelectric converting means producing a first signal for time intervals during which said objects enter in said light screen; a pulse generator for producing pulses the number of which is related to amounts of movements of said objects by means of said conveying means; a pulse counter for counting the number of said pulses which are generated in a time interval during which said photoelectric converting means produce said first signal; and means for calculating the dimensions of said objects in the travelling direction on the basis of the count values of said pulse counter.

BRIEF DESCRIPTION OF THE DRAWINGS

FIGS. 3A, 3B and 3C illustrate waveforms of signals at various points of the circuits shown in FIG. 2;

FIG. 4 is perspective view depicting an outside view of the measuring apparatus of this embodiment;

FIG. 5A is a perspective view showing the manner of securing a plane mirror to frame in an adjustable manner and FIG. 5B is a cross section of FIG. 5A;

FIG. 6 shows a graph representing a relation between diameters of objects and count values; and FIG. 7 is diagram showing an arrangement of two sets of plane mirrors in another embodiment of the measuring apparatus according to the invention.

DESCRIPTION OF THE PREFERRED EMBODIMENTS

Figure 1:
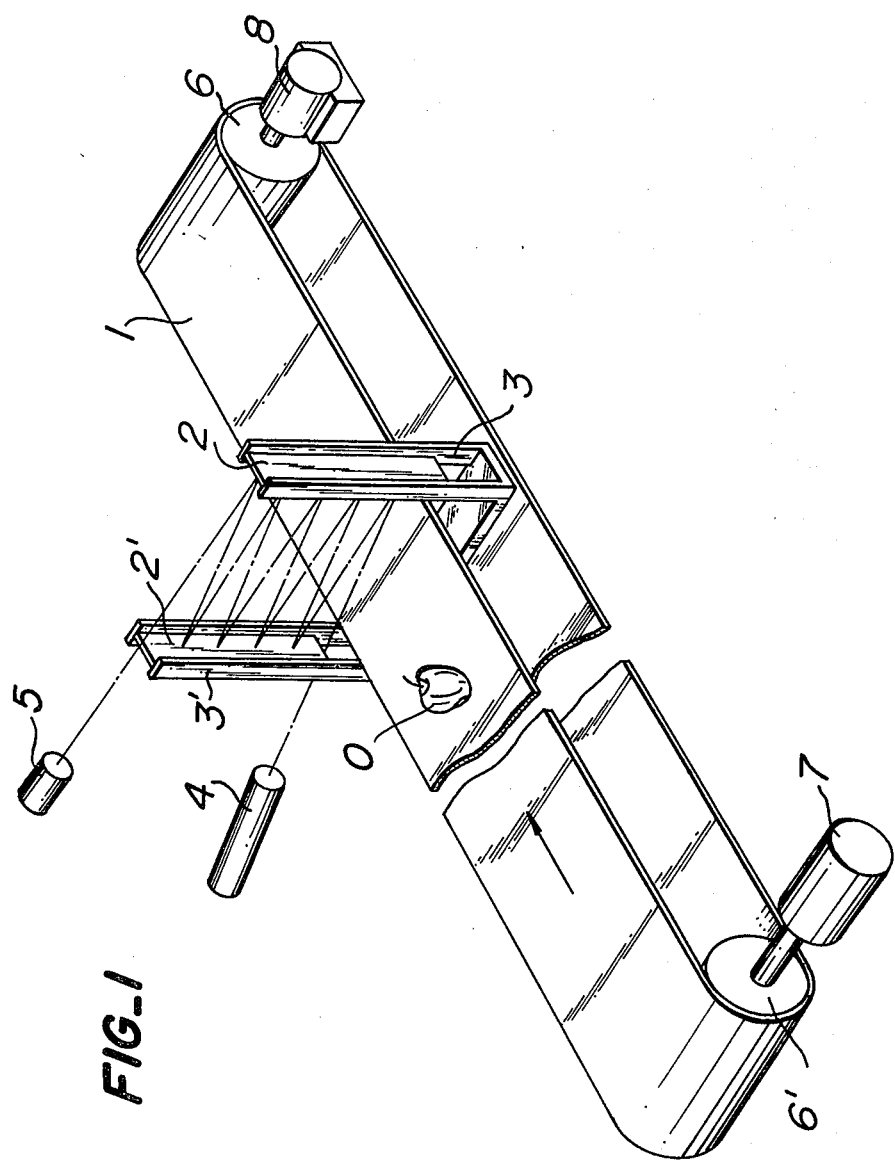
FIG. 1 is a perspective view showing diagramatically one embodiment of the measuring apparatus according to the invention.

FIG. 1 is a perspective view illustrating an embodiment of the measuring apparatus according to the invention. This measuring apparatus comprises a conveying belt 1 for carring objects to be measured, e.g. fruits such as apples, peaches, pears, oranges, etc. and a pair of plane mirrors 2 and 2' arranged at opposite sides of the belt 1 and secured to supporting members 3 and 3', respectively. There is provided a laser light source 4 of for example He-Ne gas laser. The light source 4 projects a laser light beam onto the mirror 2 at an inclined angle. The beam incident on the mirror 2 is reflected by the mirror 2 toward the other mirror 2' and is further reflected thereby toward the mirror 2. In this manner the light beam is repeatedly reflected by the mirrors 2 and 2' towards the upper end of the mirrors 2 and 2' so as to form a light screan in a plane at right angles to the travelling direction of the conveying belt 1. The light beam finally passes above the upper edge of the mirror 2' and is incident on a photoelectric converting device 5 such as a photo-diode.

The conveying belt 1 is supported by a pair of wheels 6 and 6'. To a shaft of the wheel 6' is coupled an electric motor 7 so that the belt 1 travels in a direction shown by an arrow in FIG. 1. To a shaft of the other wheel 6 is coupled a rotary pulse generator 8 which produces electrical pulses in proportion to a rotation angle of the wheel 6. That is to say the number of pulses is proportional to the amount of movement of belt 1.

Figure 2:
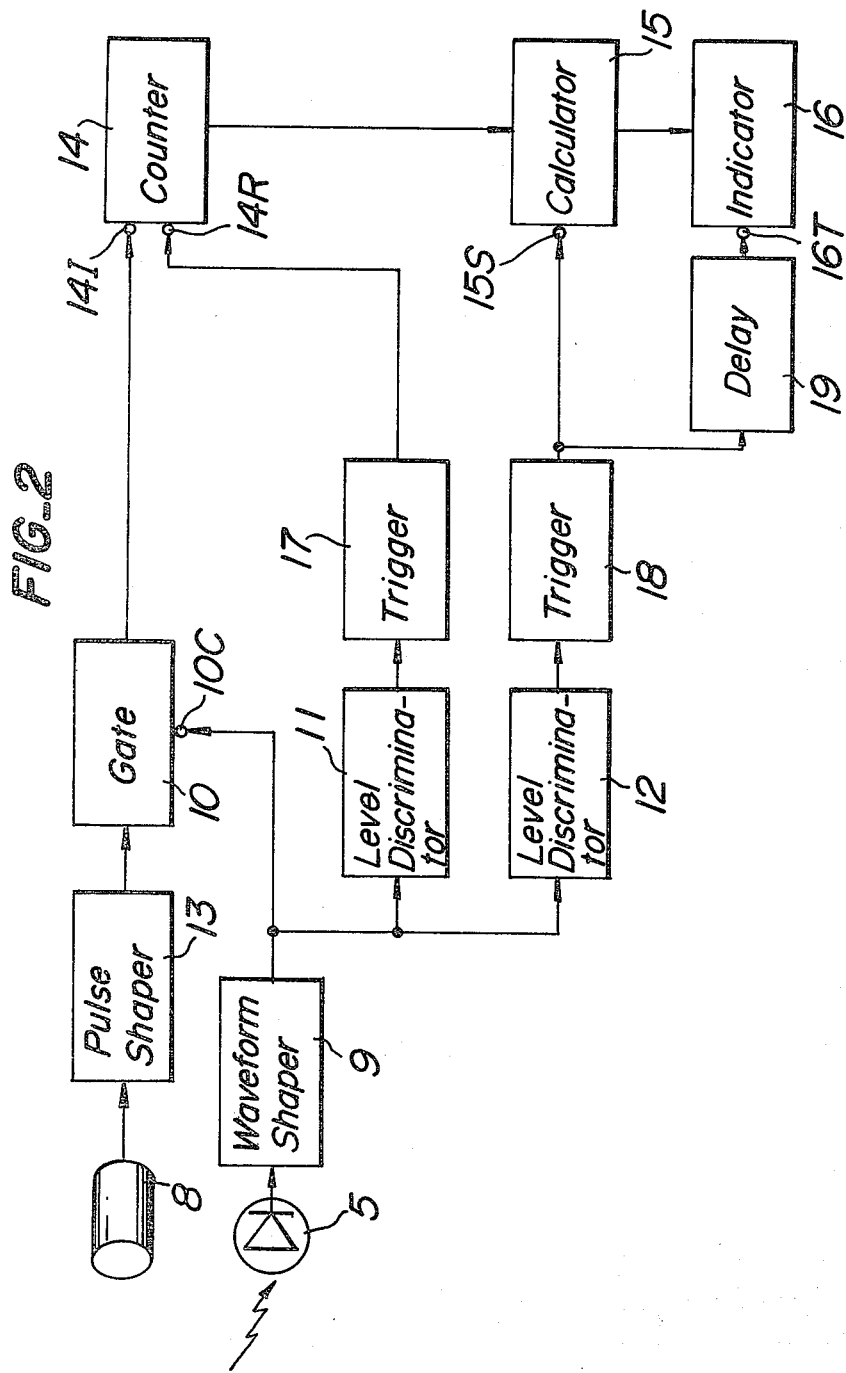
FIG. 2 is a circuit diagram of the measuring apparatus of this embodiment.

FIG. 2 is a block diagram illustrating a construction of a circuit for processing electrical signals produced by the photo-electric device 5 and the pulse generator 8 so as to indicate dimentions of the objects. The output of the photo-diode 5 is connected to an input of a waveform shaper circuit 9 which produces a positive potential when the photo-diode 5 receives the laser beam and zero potential when the laser beam is interrupted by the objects which are conveyed by the belt 1. The output of the waveform shaper 9 is connected to a control terminal 10C of a gate circuit 10 and first and second level discriminator circuits 11 and 12. The gate circuit 10 is so constructed that when the output from the waveform shaper circuit 9 is positive the gate circuit 10 is closed, but when the output from the circuit 9 is at zero potential the gate circuit 10 is opened.

The output of the pulse generator 8 is connected to an input terminal 14I of a counter circuit 14 through a pulse shaper circuit 13 and the gate circuit 10. The output of the counter circuit 14 is connected to an input of a calculating circuit 15 and an output of this calculating circuit 15 is further connected to an input of an indicator circuit 16.

The level discriminator 11 produces a signal at a time instance when the output potential from the waveform shaper circuit 9 changes from positive to zero, while the second level discriminator circuit 12 produces a signal at a time instance when the output potential from the waveform shaper circuit 9 changes from zero to positive. The outputs of the first and second level discrimintor circuits 11 and 12 are connected to first and second trigger circuits 17 and 18, respectively. These trigger circuits produce output pulses upon receiving output signals from the level discriminator circuits 11 and 12, respectively. The output of the first trigger circuit 17 is connected to a reset terminal 14R of the counter circuit 14 and the output of the second trigger circuit 18 is connected to a calculation command terminal 15S of the culculating circuit 15 as well as to an indication command terminal 16T of the indicator circuit 16 by means of a delay circuit 19.

Now the operation of the measuring apparatus of the present embodiment will be explained with reference to FIG. 3 which shows waveforms of signals appearing at various points of the circuit of FIG. 2. The motor 7 is always energized and the conveying belt 1 is continuously travelling. From the pulse generator 8 are produced pulses a repetition rate of which is proportional to the travelling speed of the conveying belt 1. FIG. 3A illustrates the output pulse train produced from the pulse shaper circuit 13. These pulses are supplied to the gate circuit 10. However as long as an object O which is placed on the conveying belt 1 and is moved together with the belt 1 is not existent in the light screen formed between a pair of mirrors 2 and 2' and thus the laser beam is incident upon the photodiode 5 so that the output potential of the waveform shaper circuit 9 is positive and the gate circuit 10 is made closed, said pulses from the pulse shaper circuit 12 do not reach the counter 14. Now at an instance $t_1$ the object O enters in the light screen and interrupts the laser beam. Then the output from the waveform shaper circuit 9 changes from positive potential to zero potential and the first level discriminator 11 and trigger circuit 17 operate to produce a pulse by means of which the counter circuit 14 is reset to a zero count value. At the same time the gate circuit 10 is made opened by the output from the waveform shaper circuit 9. Now the pulses from the pulse shaper circuit 13 pass through the gate circuit 10 and are counted by the counter circuit 14.

The object O has passed through the light screen at a time instance $t_2$ and the laser beam is again incident on the photodiode 5 so that the gate circuit 10 is made closed and thus the pulses from the pulse shaper circuit 13 do not reach the counter circuit 14. Therefore the counter circuit 14 has counted the number of pulses between $t_1$ and $t_2$ as shown in FIG. 3C. As mentioned above the repetition rate of the pulses is proportional to the travelling speed of the object O and thus said count value is proportional to a diameter of the oject O in the travelling direction. At the time $t_2$ the output signal from the waveform shaper circuit 9 changes from zero to positive potential as shown in FIG. 3B. The second level discriminator circuit 12 responds to this positive going transient to produce an output signal. Thus the second trigger circuit 18 supplies a pulse signal to the calculation command input 15S of the calculator circuit 15 in which the count value transferred from the counter circuit 14 is multiplied by a given constant which has been previously determined from a relation between the count values and actually measured diameters of objects. In this manner the calculator circuit 15 produces a signal representing a diameter value in given unit. After a short time delay circuit 19 supplies a delayed signal to the indication command terminal 16T of the indicator circuit 16 so as to visually display or print out said diameter value. In the manner described above diameters of objects which are successively transported on the conveying belt 1 can be accurately measured. In this case care should be taken that successive objects do not enter into the light screen simultanously, which causes a measuring error.

FIG. 4 is a perspective view showing an outside view of the actual apparatus of this embodiment. Along one side of the conveying belt 1 is arranged a base 20 on which an U-shaped frame 21 and a casing 22 are secured. The frame 21 is so constructed that it is laid across the belt 1 and the plane mirrors 2 and 2' are arranged in leg portions thereof. In the frame 21 there is also arranged the photo-diode 5. In the casing 22 the laser light source 4 is arranged. At the lower part of the frame 21 is arranged a prism P which difracts the the laser beam from the laser light source 4 at right angles towards the plane mirror 2. In practice it is rather difficult to adjust the optical system so as to obtain the light screen of hight accuracy. For this purpose the plane mirrors 2 and 2' are supported on the frame 21 in such a manner that their angles with respect to the frame surface can be precisely adjusted.

FIGS. 5A and 5B show the manner of supporting the plane mirror 2' on the inner surface of the frame 21. The plane mirror 2' is cemented onto a vertical angle adjusting plate 22 which is pivotally coupled by a hinge 23 to a horizontal angle adjusting plate 24. Between the plates 22 and 24 is arranged a leaf spring 25 and at the upper ends of the plate 22 and 24 is provided an adjusting screw 26. Thus by adjusting this screw 26 the plate 22 is rotated about an axis X–X' so as to adjust the angle between the plane mirror 2' and the surface of the frame 21. The horizontal angle adjusting plate 24 is coupled to the frame 21 by a pair of rods 27 and 27' which are provided on a vertical center line of the plate 24. The plate 24 is further provided with a pair of adjusting screws 28 and 29 at both sides of the plate 22, Therefore by adjusting the screws 28 and 29 the plate 24 rotates about the axis Y–Y so that the angle between the plane mirror 2' and the surface of the frame 21 can be adjusted. In this manner the angle between the plane mirror 2' and the frame 21 can be precisely adjusted. The other plane mirror 2 is supported on the frame 21 in the same manner as that just described above.

FIG. 6 is a graph showing the result of measurement with the apparatus of this embodiment. A horizontal axis denotes a diameter of apples and a vertical axis represents the count value of the counter 14 (FIG. 2). The measurement has been carried out under the following conditions:

laser light source; He-Ne laser (6328A)
diameter of laser beam: 0.8 mm
divergent angle of laser beam: 1 m radian
plane mirrors 2, 2': aluminum deposited surface (reflection ratio 95 to 98%)
distance between mirrors: 150 mm
the number of reflections; six
pitch of laser beam at light screen: 5 mm
speed of conveying belt 1: 20 meter/minute
pulse generator 8: 1000 pulse /rotation
photo-diode 5: Si photo-diode According to the invention use is made of the laser light source which can produce the constricted light beam having the small diameter of about 0.5 to 1 mm and having the small divergent angle of about 1 m radian, so that very high S/N can be obtained as compared with usual lamp light sources and the measurement of extremely high accuracy can be effected. The pitch of light beam at the light screen between the plane mirrors 2 and 2' should be determined with considering the contour of objects to be measured. When objects have uneven surfaces, the pitch of the light screen should be small. In order to increase the accuracy of measurement the number of pulses generated by the pulse generator should be increased.

Although the light intensity of the laser beam is quite large the amount of light received by the photoelectric converting means 5 decreased after ten of twenty times of reflections at the plane mirrors 2 and 2'. Thus it is preferable to use a surface reflection mirror having coated metal layer on the front surface rather than to use a usual mirror having coated a reflection layer on the rear surface so as to avoid light absorption by the plane mirror.

The present invention is not limited to the embodiment explained above, but many modifications are possible within the scope of the invention. For example the photoelectric converting element is not limited to the silicon photo-diode 5, but may be a germanium photo-diode, cadmium compound photo-conductor or a photo-transistor. Moreover a suitable filter may be arranged in front of the photoelectric converting means so as to cut external light rays other than the laser beam. The laser light source is not limited to the He-Ne gas laser, but it may be composed of any kind of lasers which have been practically used. But since the He-Ne gas laser produces a visible red light, it is convenient to adjust the optical system.

Moreover in the above embodiment a separate mirror may be arranged at the position of the photo-diode 5 and the laser beam leaving the mirrors 2 and 2' is returned to the mirror 2 by means of said separate mirror and is repeatedly reflected between the mirrors 2 and 2' and the photo-diode 5 is arranged near the lase light source 4. In this manner the laser light sourse 4 and the photoelectric converting means 5 can be arranged at positions close to each other so that the electrical wiring for these devices can be simplified.

In order to avoid the influence of stray light it is preferable to arrange a slit in front of the plane mirror.

FIG. 7 is a diagramatic view of another embodiment of the measuring apparatus according to the invention in which two sets of laser light sources 4A; 4B, plane mirrors 2A, 2A'; 2B, 2B' and photoelectric converting means 5A; 5B are provided. The laser light source 4A and a pair of plane mirrors 2A and 2A' form a first light screen which makes angles of 45° with respect to the travelling direction shown by an arrow, while the laser light source 4B and a pair of plane mirrors 2B and 2B' form a second light screen which makes angles of 135° with respect to the travelling direction, thus the first and second light screens intersect with each other at angles of 90° above the conveying belt 1. Therefore two diameters of an object can be measured in two orthogonal directions and an average diameter of these two diameters can be obtained by a conventional operating treatment.

Furthermore if it is ensured that the objects are conveyed at a completely constant speed, the pulse generator 8 coupled to the wheel 6 may be replaced by a usual clock pulse generating circuit. The circuit for treating the electric signals is not limited to that shown in FIG. 2 and various modifications of the circuit may be designed. For example the gate circuit 10 of FIG. 2 may be deleted. The measuring apparatus according to the invention may be used in conjunction with a device for selecting the objects in accordance with their sizes.

What is claimed is:

1. An apparatus for measuring dimensions of travelling objects comprising:
    conveying means for transferring the objects to be measured through a measuring position;
    a base member arranged at one side of said conveying means;
    a substantially U-shaped frame having two leg portions, one of which is secured to the base member and the other leg portion is of a free end;
    a laser light source for producing a laser light beam and secured to the base member;
    a pair of plane mirrors each of which is arranged on the respective one of said leg portions, said plane mirrors being so arranged with respect to each other that the laser light beam is incident upon one of said plane mirrors and is repeatedly reflected between said plane mirrors so as to form a light screen at said measuring position;
    photoelectric converting means arranged to receive the laser beam leaving the plane mirrors and produce a first signal representing time intervals during which said objects are in the light screen;
    a pulse generator for producing pulses the number of which is related to amounts of movements of said objects by means of the conveying means;
    a pulse counter for counting the number of those pulses which are generated in the time intervals during which said photoelectric converting means produce said first signal;
    means for calculating the dimensions of the objects on the basis of the count values of said pulse counter; and
    means for securing said plane mirrors to said leg portions of the frame in an adjustable manner, said adjustably securing means including a verticl angle adjusting plate onto which the plane mirror is cemented, a horizontal angle adjusting plate is pivotally coupled, a spring member disposed between these angle adjusting plates, a vertical angle adjusting member provided in the vertical angle adjusting plate at an end position which is remote from the pivotally coupled position, means for securing said horizontal angle adjusting plate to the leg portion in such a manner that the horizontal angle adjusting plate can be tilted with respect to the leg portion so as to adjust the horizontal angle of the plane mirror.

2. An apparatus according to claim 1, wherein said light screen is so positioned that it intersects with the travelling direction of the objects to be measured at about 45° and said apparatus further comprises another set of a laser light source, a pair of plane mirrors and photoelectric converting means, this other set being so arranged that it produces another light screen which intersects with said first mentioned light screen substantially at right angles.

* * * * *